United States Patent
Lessard

[15] 3,684,376
[45] Aug. 15, 1972

[54] RANGER-FINDER IN A TELESCOPIC SIGHT

[72] Inventor: Donald E. Lessard, 6921 Los Amigos Circle, Huntington Beach, Calif. 92647

[22] Filed: Sept. 10, 1970

[21] Appl. No.: 71,020

[52] U.S. Cl. .................................. 356/21, 350/10
[51] Int. Cl. ........................................ G01c 3/22
[58] Field of Search ........... 33/50 A; 350/10; 356/21

[56] References Cited

UNITED STATES PATENTS 3,123,915  3/1964  Wilkinson .................... 356/21
3,386,330  6/1968  Barris et al. ................. 356/21

*Primary Examiner*—Ronald L. Wibert
*Assistant Examiner*—Orville B. Chew, II

[57] ABSTRACT

This invention relates to a range-indicating, variable-power telescopic sight; based on the principle of comparing adjustable spaced reference elements, with known target dimensions, reading said comparison on a scale of distance. More specifically, non-magnifying reference elements positioned within the optical system in a variable-power telescope at the rearward focal plane are superimposed upon the image of the target object and the size of the target object is altered by manually varying the degree of magnification of said target object until such target object is bracketed just between the spaced reference elements. A scale of target object distance, also within the optical system, positioned at the rearward focal plane, operativly connected to the means of varying the degree of magnification of the target object and correlated with the various degrees of magnification shows the distance to the target object once the foregoing condition is achieved.

5 Claims, 9 Drawing Figures

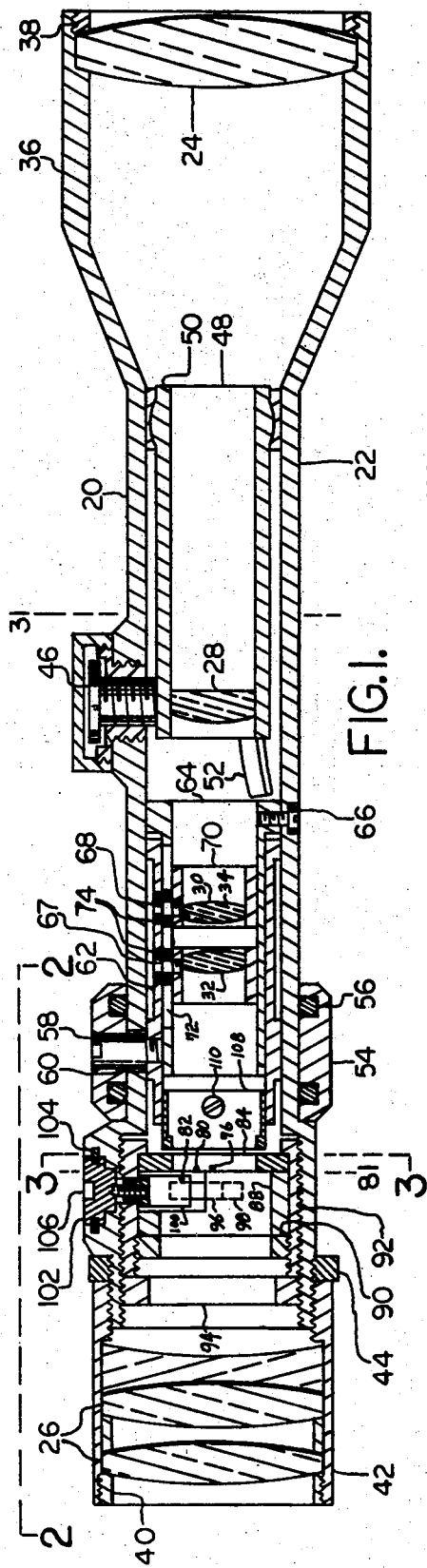
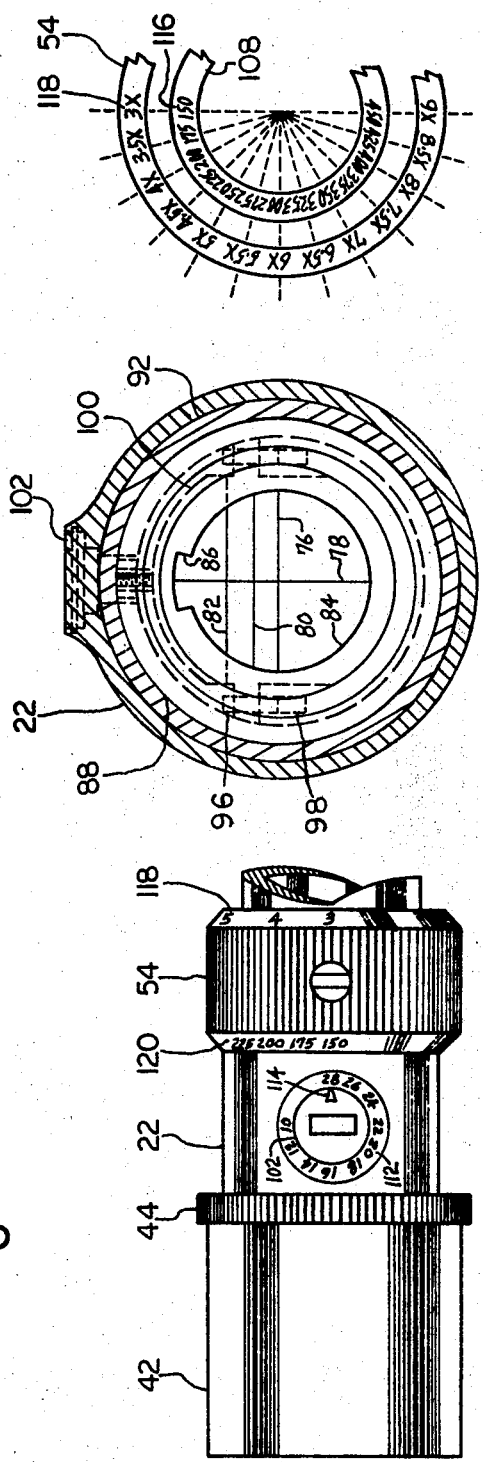
INVENTOR.
DONALD E. LESSARD

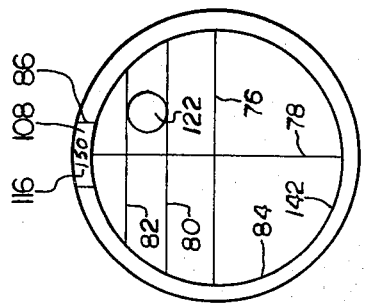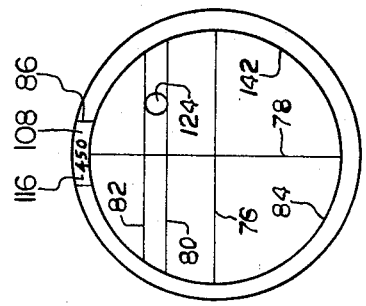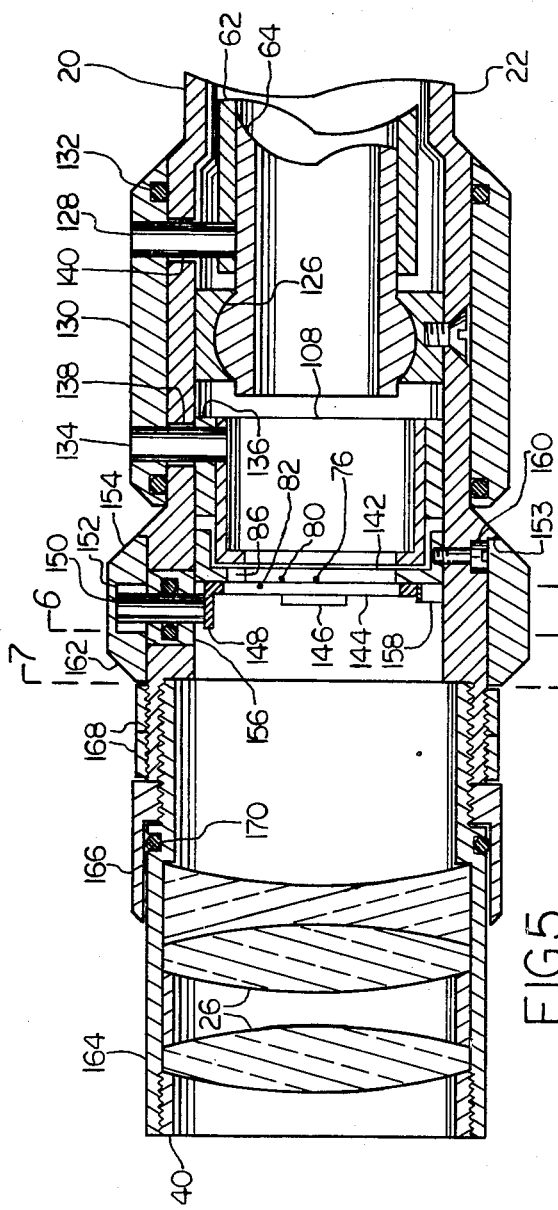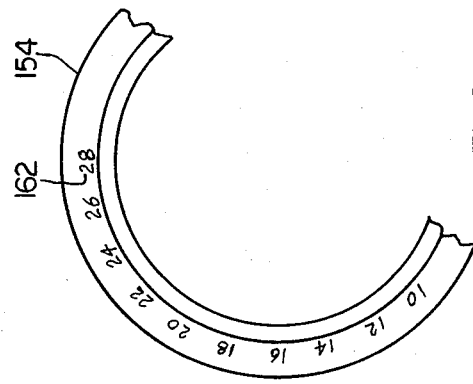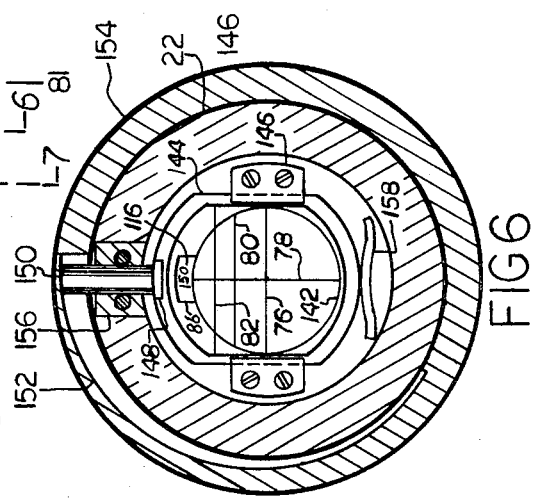
INVENTOR.
DONALD E LESSARD

RANGER-FINDER IN A TELESCOPIC SIGHT

It is a commonly accepted fact, that inspite of todays more sophisticated shooting equipment, including optical sights; a serious problem consistantly confronting a marksman is the inability on their part of accurately estimating the distance to their target. In fact, if anything, modern optical sights distract what little natural ability a marksman may have in estimating target distance by simple magnification of the target object, which tends to give the marksman the illusion that the target is at a far lesser distance than what it actually is.

With the use of modern high powered ammunition the trend is for many marksman to attempt shots at game at increasingly greater distances. Unfortunately, due to the inability of the marksman to estimate target distance, much of this attempted long range shooting results only in wounded and lost game.

Theoretically it is possible to use a range-finding device which is seperate from the telescopic sight. However, in actual practice it is not only generally to much trouble for the marksman to carry around a seperate range-finding device, but rarely would he ever have the time to set aside his shooting equipment, use the range-finding device, pick his shooting equipment back up again and expect the game to still be within shooting range.

The pressing need is for a range-finder within the optical system which is simple, fast, and accurate to use; and most important, a range-finder which is functional on game of any size or type.

The present invention meets this basic need by taking advantage of an optical fact as well as the improvements as set forth herein. The optical fact being, that in the use of a variable power telescopic sight, for example a three power to nine power; an object viewed through the optical system at three power, will appear to the observer as being exactly one half the size that the same object will appear at a six power setting. Thus, coupled with the improvements of adding manually adjustable spaced reference elements for bracketing a variety of target object sizes in the non-magnifying rearward focal plane, as well as a scale of target distance also positioned at the rearward focal plane, and correlated with the spaced reference elements as well as the power changing means, an accurate estimate of target distance may be achieved. In otherwords, with the approximent size of the target area known, and with the fact that the target will fill exactly twice the area in the field of view at a six power setting, as it will at a three power setting, and by equating this changing target object size to reference elements that do not change in size, one can determine target distance when the foregoing relationship is translated into terms of target distance yardage. By locating both the target reference elements and the target distance scale within the field of view of the optical system, it is obvious that the marksman may guage the target distance without distraction or eye movement away from his line of sight.

Therefore, it is the principal object of the present invention to provide an improvement in variable power telescopes by adding target range determining features.

A second objective is the provision of range determining features which are functional on targets of any given size or type.

Another object of the invention is to provide range determining features within the optical system of the telescopic sight which will not interfere with the normal field of view.

An additional object is to provide in a variable power telescopic sight, range determining features which are simple to manufacture, require no change in the basic optical system; and which are simple, fast and accurate to use even in the hands of a novice marksman.

The features and advantages of the invention may be understood from the following detailed description and the accompanying drawings.

In the drawings, which are to be ragarded as merely illustrative:

FIG. 1 is a longitudinal diametrical section of the variable power telescope incorporating the range determining feature.

FIG. 2 is a section taken along the line 2—2 of FIG. 1 showing the power change control ring and the adjustment means, index and indicia thereof for the adjustment of the spaced reference elements.

FIG. 3 is a transverse section taken along line 3—3 of FIG. 1 showing the reticle ring aiming wires, reference elements and supporting yoke, and the target distance scale viewing window.

FIG. 4 is a fragmentary elevation showing the range scale as correlated with the power change control ring.

FIG. 5 is an enlarged fragmentary longitudinal diametrical section showing a second embodiment of the invention.

FIG. 6 is a transverse section taken along line 6—6 of FIG. 5 showing the reticle, aiming wires, reference elements, adjustment means therefore, range indicating scale and viewing window therefore.

FIG. 7 is a transverse fragmentary section taken along the line 7—7 of FIG. 5 showing the control ring and indicia thereof for adjustment of the reference elements.

FIG. 8 is an elevation showing the view seen by the user through the eye piece with reference elements adjusted to accommodate a target of comparitively large size at a distance of 150 yards.

FIG. 9 is an elevation like FIG. 8 showing the reference elements adjusted to accommodate a target of comparitively small size at a distance of 450 yards.

In the preferred embodiment of the invention illustrated by FIGS. 1 to 4 and FIGS. 8 and 9, the telescopic sight is generally designated by the reference numeral 20. The telescopic sight has the usual main tube body designated 22, an objective lens 24 at the forward end, an erector lens system 30, eye piece lens 26 at the rear, all of which cooperate to produce a magnified image of an object viewed. Objective lens 24 is mounted in the forward, enlarged section of the main tube body 22, and designated as 36, and is secured in position by means of the threaded collar 38.

The main tube body 22 houses the erector lens system 30, the windage and elevation correction components comprising lens 28, tube 48, and pivot point retainer 50, as well as a leaf spring 52 which biases the pivotable tube 48 against the windage and elevation adjustment screws 46. Ordinarily the elevation and windage adjustments are made carefully for alignment of the telescopic sight relative to the bore of the gun barrel when the telescopic sight is first mounted on the gun and thereafter the two adjustments are not normally disturbed. The erector lens system 30 in the particular form shown in FIG. 1, comprises erector lens 32 and 34 housed in seperate mounts 70 that are, in turn, mounted for longitudinal movement in erector lens tube 64. This erector lens tube 64 is mounted within the main tube body and prevented from longitudinal or rotational movement by means of the retainer screw 66. To accomplish a change in degree of magnification of the target object by varying the spacing between erector lens 32 and 34, the power control ring 54 which is accessible on the outside of the main tube body is rotated about the outside diameter of the main tube body 22. Power control ring 54 is operatively connected to a sleeve 62 that encircles the erector lens tube 64 by means of pin 58. The sleeve 62 has angular slots 74 therein that receive pins 67 and 68 connected to the erector lens mounts 70. These pins pass through a longitudinal slot 72 in the erector lens tube 64. Thus it can be seen that as power control ring 54 is rotated, it will act through pin 58 traveling through annular slot 60 in tube 22 and with pin 58 connected to sleeve 62, to change the spacing between the erectors.

The eye piece lens system 26 is housed in a tube 42 screwed onto the rearend of the main tube body 22 and locked in selective position by lock ring 44. Adjustment of the eye piece relative to the rear focal plane containing reticle 84 can be made to accommodate differences in the user's vision. The reticle 84 is housed within the main tube body 22 by means of threaded sleeve 92 which is screwed into the rearend of the main tube body 22 and retained in position by lock ring 94. The reticle 84 is retained in longitudinal position by means of a collar formed at the forward end of threaded sleeve 92, which collar arrests the forward face of the reticle 84 and by means of the rearward face of reticle 84 being compressed forward by tightning lock ring 90 against ring 88.

In the usual manner the optical system of the telescopic sight provides a forward focal plane at the approximate location of the dotted line 31, and a rearward focal plane at the approximate location of the dotted line 81 in FIG. 1. The reticle ring 84 carries conventional aiming elements 76 and 78.

All of the structure described to this point is conventional and old in the art. The mechanisms taught by the present invention will now be described.

THE RANGE-FINDER MECHANISM, FIGS. 1 THROUGH 4, 8 AND 9

The principal parts of the range-finder mechanism include: a target distance indicating ring 108 of transparent material (FIGS. 1 and 4); a fixed reference element 80; a adjustable reference element 82; a yoke 100 for support and adjustment of reference element 82; pins 96 attached to yoke 100 for guidance thereof; ring 88 for support and guidance of yoke 100 and pins 96 through cylindrical bore 98 in ring 88; screw 102 for actuating yoke 100; retainer 104 for screw 102; reference element spacing indicia 112 and indicator 114; target distance indicia 116 and 120, (FIGS. 1, 3 and 4); a viewing window 86 (FIG. 3) for viewing target distance indicia 116.

The target distance indicating ring 108, which carries the target distance indicating indicia 116 on the rearward face of 108, and positioned approximately at the rear focal plane 81 is anchored to the sleeve 62. Thus as sleeve 62 is rotated by means of power control ring 54 and pin 58 for the primary purpose of altering the degree of magnification through the cooperation of the balance of the erector lens system, the target distance indicating ring 108 is likewise rotated. With the target distance indicia 116 being fixedly marked on the rearward portion of ring 108, and with viewing window 86 being fixedly anchored to the main body tube 22, as ring 108 is rotated, only one target distance indicia 116 will be visible in the field of view at any one time. Thus with the target distance indicia 116 correlated with the various degrees of magnification as shown in FIG. 4, if the power control ring 54 is set at three power the target distance indicia 116 reading 150 yards will be visible in the viewing window 86. Or if the power control ring 54 is set at six power, the target distance indicia 116 reading 300 yards will be visible in viewing window 86. In otherwords for example if an object of a given size positioned 150 yards away from the viewer appears to fill one fourth of the field of view with the telescope at a power setting of three power, the same object now positioned at a distance of 300 yards will appear to the viewer to fill only one eighth of the field of view. However if the power setting were now to be changed to six power, the object viewed still at 300 yards will now appear to be the same size as it appeared to be at a distance of 150 yards at a power setting of three power. Thus with reference elements 80 and 82 adjusted to span a target object of a given size, with target object positioned at a distance of 150 yards and with a power setting of three power, by moving the target object out to a distance of 300 yards, the target object will now fill only one half the span between reference elements 80 and 82. However if the power control ring 54 is now set at a power setting of six power, the target object will exactly double in size and thus exactly fit the span between reference elements 80 and 82. Thus with the target distance indicia 116 correlated with and operatively connected to the means of the varying degrees of magnification 118, and with the viewing window 86 being fixedly mounted (FIGS. 3 and 4), as the degrees of magnification are varied, only one of the target distance indicia 116 will be visible in the viewing window 86 at any one particular power setting.

Reticle ring 84 carrying aiming elements 76 and 78, reference element 80 and viewing window 86 as well as ring 88, yoke 100, pins 96 and lock ring 90 are all contained in the threaded sleeve 92. The threaded sleeve 92 is screwed into the rear end of the main tube body 22, and secured in position by means of lock ring 94 (FIG. 1). Yoke 100 is slidingly mounted on ring 88 for verticle travel by means of pins 96 attached to yoke 100 and being free to slide in the cylindrical bore 98, in ring 88. Screw 102 being retained from other than rotational movement by retainer ring 104, and with screw 102 being threaded to coordinate with yoke 100, as screw 102 is rotated by means of slot 106, yoke 100 is raised or lowered with the cooperation of pins 96 and cylindrical bores 98, (FIGS. 1 and 3). With reference element 80 being fixedly mounted on reticle ring 84, and with reference element 82 being fixedly mounted on movable yoke 100, and with yoke 100 being threadedly connected with screw 102; as screw 102 is rotated yoke 100 and reference element 82 move in a verticle attitude thus varying the spacing between reference elements 80 and 82. Indicia 112 (FIG. 2) for screw 102 and indicator 114 (FIG. 2) are in cooperation with the reference elements 80 and 82. Thus if yoke 100 and reference element 82 are so positioned as to create a span between reference elements 80 and 82 to bracket an object of a height equal to 28 inches with the object at a distance of 150 yards, the indicia 112 reading of 28 and indicator 114 will be in coordination, (FIGS. 2 and 8).

FIG. 8 shows the reference elements 80 and 82 bracketing a target object 122 of a fairly large size, FIG. 9 shows the reference elements 80 and 82 bracketing a target object 124 of fairly small size. FIG. 8 and FIG. 9 also show how only one yardage indication (target distance indicia 116) will appear in the viewing window 86. FIG. 2 shows how the second target distance indicia 120 is in coordination with the various degrees or power settings 118, as well as how the screw 102 indicia 112 coordinates with indicator 114. FIG. 3 shows the relationship between the aiming wires 76 and 78, the reference elements 80 and 82 and the viewing window 86. FIG. 3 also shows the construction of yoke 100, pins 96, ring 88, cylindrical bores 98 and reticle ring 84. The viewing window 86 may be positioned any where around the circumference of the inner diameter of reticle ring 84. Reference elements 80 and 82 may be positioned any where within the field of view. FIG. 4 shows the relationship between power control ring 54, target distance indicia ring 108, power setting indicia 118 and target distance indicia 116. The relationships are not intended to be restricted or limited as shown, but only as illustrative.

The operation and function of the range-finding features will now be described.

OPERATION

The manner in which this invention functions for it's purpose may be readily understood from the foregoing description. If the telescopic sight is to be employed for deer, and the user estimates the target object size to be approximately 20 inches, he first rotates screw 102 until indicia 112 reading of 20, is in coordination with indicator 114. This action adjusts reference element 82 in relationship to reference element 80 such, that reference elements 80 and 82 will bracket an object 20 inches in heighth, with the object at a given distance, for example 150 yards. Upon sighting the game and viewing same through the telescopic sight, at a power setting of three power, if the target object does not completely fill the span between reference elements 80 and 82; the user then rotates the power control ring 54 to increase the degree of magnification of the target object until said target object has increased in apparent size such that it will just fit the span between reference elements 80 and 82. The target distance indicia 116 showing the yardage distance to the target object will simultaniously appear in the viewing window 86, FIGS. 8 and 9.

THE SECOND EMBODIMENT OF THE INVENTION

FIGS. 5–9

The second embodiment of the invention differs from the first embodiment as follows. Whereas in the first embodiment the refference element 82 is raised or lowered to adjust the span between itself and reference element 80 through the cooperative means of the screw 102, yoke 100, pins 96 and ring 88; the second embodimant of the invention accomplishes the same function through a cam and push rod mechanism which act against a ring and opposing spring, which ring supports reference element 82, and which ring is slidingly mounted for vertical travel. The second embodiment of the invention also differs from the first embodiment in that whereas in the first embodiment the target distance indicating indicia ring 108 is fixedly anchored to sleeve 62, for rotational purposes thereof; in this second embodiment of the invention the target distance indicia ring 108 is operatively connected to sleeve 62 by means of a power control ring simular to control ring 54 of the first embodiment, but differing from the first embodiment in that this second embodiment power control ring contains seperate accuating pins and seperate annular slots in the tube 22 therefore. One of said accuating pins and annular slots is for the purpose of the rotation of sleeve 62. The other of said accuating pins and annular slots is for the purpose of the rotation of the target distance indicia ring 108.

In FIGS. 5–9 the structure is largely simular to the previously described structure of the first embodiment as indicated by the use of corresponding numerals to indicate corresponding parts.

The power control ring 130 is constructed like the previously described power control ring 54, but differs in the respect in that two pins 128 and 134 are utilized to accomplish the same purpose as does pin 58 of the first embodiment.

FIG. 5 shows power control ring 130 encircling the main tube body 22 with "O" rings 132 serving as a seal against foreign matter or moisture from entrance to main tube body 22 through annular slots 128 and 140. Pin 128 anchored to control ring 130 and passing through annular slot 140 in tube 22, is likewise anchored to sleeve 62 for the purpose of rotation thereof as described in the first embodiment of the invention. Pin 134 anchored to control ring 130 and passing through annular slot 138 in tube 22 is also anchored to rotatable sleeve 136 inside the tube 22. The distance indicia ring 108, carrying the distance indicia 116, is anchored to sleeve 136. Thus as power control ring 130, is rotated about the exterior of tube 22, for the purpose of varying the degree of magnification through the cooperation of pin 128, sleeve 62 and the balance of the erector lens components; through the cooperation of pin 134 and sleeve 136, the distance indicating indicia ring 108 is likewise and simultaniously rotated for the purpose as fully described in the first embodiment of the invention. The erector lens system and components differ from the first embodiment, in that whereas in the first embodiment the erector lens components and system operates on a fixed optical axis principle, this second embodiment as shown in FIG. 5 utilizes a erector lens system which allows the pivoting about it's optical axis by means of the ball and socket mechanism 126, positioned near the rearward focal plane. Thus in the second embodiment of the invention, the components 28, 50 and 48 of the first embodiment are not utilized; but instead the windage and elevation screws 46 exert pressure against the forward end of sleeve 62 and spring 52 with the rear end of tube 64 being pivotable by ball and socket 126 for the purpose of altering the optical axis of the erector lens system for alignment of the optical axis of the telescopic sight with the bore of the gun barrel.

Ring 154 FIGS. 5, 6 and 7 encircles tube 22 and is restrained from longitudinal movement by means of collar 153 at the forward rim and lock rings 168 at the rearward rim. Indicia 162 on the outside diameter of ring 154 serves the same purpose as does indicia 112 of the first embodiment of the invention. Reticle ring 142 carrying aiming elements 76 and 78 and viewing window 86, may be anchored to the inside diameter of tube 22 by means of screw 160. Reticle ring 142 serves the same purpose as does reticle ring 84 of the first embodiment and as described thereof. As shown in FIGS. 5 and 6 brackets 146 are anchored to reticle ring 142 for the purpose of slidingly mounting ring 144 for verticle movement thereof. Reference element 82 is anchored to ring 144. The ring 154 which is rotatable on the outside diameter of tube 22 contains an inner cam surface 152, which reacts against pin 150 which in turn is slidingly mounted in bushing 156, which in turn is anchored to tube 22. One end of pin 150 rests against the cam surface 152 of ring 154, the other end of pin 150 rests against tab 148 of ring 144. Spring 158 exerts pressure against a side of ring 144 opposite tab 148. Thus as ring 154 is mannually rotated, the cam surface 152 exerts pressure on one end of pin 150. This action in turn causes the other end of pin 150 to exert pressure on the tab 148. With the tab 148 being anchored to ring 144, and with ring 144 being slidingly mounted on reticle ring 142, and with reference element 82 being anchored to ring 144, and fixed reference element 80 being anchored to reticle ring 142; as ring 144 is depressed downward through the components and action described above, the spacing between reference elements 80 and 82 is varied. The purpose of the variance of the reference elements 80 and 82 is fully described in the first embodiment of the invention.

As shown in FIG. 5 the eye piece lens system 26 differs from the first embodiment in that lens 26 housing 164, is threadingly attached to main tube body 22, and locked in position by lock ring 166. "O" ring 170 serves the purpose of preventing the entrance of foreign matter or moisture to the inside diameter of main tube body 22.

In the operation of the second embodiment of the invention, the user first selects the spacing for reference elements 80 and 82, and for the purpose as described in the first embodiment; by manually rotating ring 154. He may then note said reference element spacing from indicia 162. The user may then bracket the target object between reference elements 80 and 82 by varying the degree of magnification of the target object through rotation of power control ring 130 which action is thoroughly described in the first embodiment of the invention by rotation of power control ring 54. The target distance indicia 116 will appear in the viewing window 86 (FIGS. 8 and 9) simultaniously as fully described in the first embodiment of the invention. FIG. 5 shows all of the target distance determining components as well as the eye piece lens means of adjustment for a particular users vision. FIG. 6 shows the reticle ring 142, aiming wires 76 and 78, reference elements 80 and 82, support means ring 144 and brackets 146, adjustment means for ring 144, cam surface 152, ring 154, pin 150, tab 148 and spring 158. FIG. 6 also shows viewing window 86 and target distance indicia 116. FIG. 7 shows a section of ring 154 and indicia 162. FIGS. 8 and 9 serve the same purpose as fully described for the first embodiment of the invention.

In the specifications and claims the reference to "known" sizes of deminsions of a target object, such as known heights or known widths of a target object, are intended to include also sizes such as widths or heights which can be estimated by the observer. As the word "target object" is used herein it is intended to include any object which is sighted through the telescope, whether it is one to be fired upon or not.

Although the invention has been described in detail for the purposes of illustration and disclosure of the invention as applied to a gun sight, it will be understood that the invention is equally applicable to other telescopic optical instruments such as range-finders, binoculars, minoculars, telescopes, spotting scopes, and the like. My description in specific detail of the selected embodiments of the invention will suggest various changes, substitutions and other departures from my disclosure within the spirit and scope of the appended claims.

I claim:

1. A range-finder in a telescopic sight which comprises; a main body tube, objective lens located at the forward end of the tube body, erector lens means mounted in the tube body for axial movement therein, adapted to produce an erect image of a target object, which axial movement varies the degree of magnification of the target object, a forward focal plane spaced forward thereof, eyepiece lens means located at the rearward end of the tube body adapted to focus upon the erect image of the target object, reticle means mounted in the tube body at a rear focal plane capable of being superimposed upon the target object, and carrying fixed aiming elements, and spaced reference elements for bracketing a variety of known dimensions of target objects, one of said reference elements which is fixed, and the other of said reference elements which is manually selectively adjustable in relationship to said fixed reference element, to accommodate the bracketing of the desired portion of a target object, of a variety of sizes of target objects, between said fixed reference element and said manually selectively adjustable reference element, said bracketing of the target object accomplished through varying the degree of magnification of the target object in the forward focal plane, comparing same with the non-magnified reference elements positioned in the rearward focal plane, indexing means with target object size indicating indicia for said manually selectively adjustable reference element, scale means of target object distance indicating indicia at a rear focal plane for viewing through the telescopic sight, operatively connected to the means of magnification variance and correlated with the changes in the degree of magnification of the target object, with the target object simultaniously bracketed between the spaced reference elements, a window at the rear focal plane for viewing of the target object distance indicating indicia.

2. A range-finder in a telescopic sight as set forth in claim 1 in which; spaced reference elements are provided for bracketing of the target object, one of said reference elements which is fixed, and the other of said reference elements which is manually selectively adjustable for varying the spacing between said fixed reference element and said selectively adjustable reference element with indexing means and target object size indicating indicia provided therefore.

3. A range-finder in a telescopic sight as set forth in claim 1 in which; target object distance indicating indicia is provided for viewing through the telescopic sight, said distance indicating indicia being operatively connected to the means of manually varying the degree of magnification of the target object and correlated with the varying degrees of magnification.

4. A range-finder in a telescopic sight as set forth in claim 1 in which; a window is provided for viewing of the target object distance indicating indicia in the telescopic sight while simultaniously viewing the target object bracketed between the spaced reference elements.

5. A method of ascertaining the distance to a variety of target object sizes of known dimensions including the steps of:
providing spaced reference elements for bracketing a known dimension of a target object,
providing means of manually setting the other of said reference elements in spacing relationship to said fixed reference element with said spacing indicating indicia provided therefore,
providing a scale of target object distance indicating indicia for viewing through the telescopic sight,
providing a window for viewing of the target object distance indicating indicia in the telescopic sight;
whereby the user may first select the desired spacing of the reference elements, determined by a known dimension of the selected target object, bracket the desired portion of the target object between the spaced reference elements by viewing the target object through the telescopic sight and manually changing the degree of magnification of the target object until said target object will fit just between the spaced reference elements and then may note the distance to the target object through the viewing window, as indicated by the target object distance indicating indicia viewed therein.

* * * * *